(12) United States Patent
Kim et al.

(10) Patent No.: US 12,417,767 B2
(45) Date of Patent: Sep. 16, 2025

(54) ELECTRONIC DEVICE AND METHOD TO CONTROL EXTERNAL APPARATUS

(71) Applicant: SAMSUNG ELECTRONICS CO., LTD., Suwon-si (KR)

(72) Inventors: Kichul Kim, Suwon-si (KR); Seolhee Kim, Suwon-si (KR); Sungbin Jin, Suwon-si (KR); Jisun Choi, Suwon-si (KR); Eunchung Noh, Suwon-si (KR); Sunghwan Baek, Suwon-si (KR); Jaeyung Yeo, Suwon-si (KR); Changyong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 335 days.

(21) Appl. No.: 18/094,694

(22) Filed: Jan. 9, 2023

(65) Prior Publication Data
US 2023/0197079 A1    Jun. 22, 2023

Related U.S. Application Data

(63) Continuation of application No. PCT/KR2022/017076, filed on Nov. 2, 2022.

(30) Foreign Application Priority Data

Dec. 16, 2021  (KR) .................. 10-2021-0180561
Dec. 27, 2021  (KR) .................. 10-2021-0188764

(51) Int. Cl.
*G10L 15/22* (2006.01)
*G10L 15/18* (2013.01)
*G10L 15/30* (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
USPC ...................................... 704/1–504
See application file for complete search history.

(56) References Cited

U.S. PATENT DOCUMENTS 9,836,452 B2    12/2017  Robichaud et al.
10,496,364 B2 *  12/2019  Yao .......................... G06F 3/167
(Continued)

FOREIGN PATENT DOCUMENTS

KR    10-0782067      12/2007
KR    10-2016-0132748  11/2016
(Continued)

OTHER PUBLICATIONS

Search Report dated Jan. 26, 2023 issued in International Patent Application No. PCT/KR2022/017076.

*Primary Examiner* — Marcus T Riley
(74) *Attorney, Agent, or Firm* — NIXON & VANDERHYE P.C.

(57) ABSTRACT

An electronic device is disclosed that, in response to at least one of an utterance intent and a control target device not being identified from utterance data, classifies a situation factor based on the utterance data, determines one or more external devices that match the classified situation factor, and generates and presents to the user terminal one or more action scenarios for one or more external devices determined for the classified situation factor.

20 Claims, 10 Drawing Sheets

(56) References Cited

U.S. PATENT DOCUMENTS

| | | | |
|---|---|---|---|
| 10,923,130 B2* | 2/2021 | Choi | G10L 17/00 |
| 2019/0027135 A1* | 1/2019 | Kim | G10L 15/22 |
| 2019/0129688 A1* | 5/2019 | Yao | G10L 15/08 |
| 2019/0251975 A1* | 8/2019 | Choi | G10L 17/06 |
| 2023/0197079 A1* | 6/2023 | Kim | G10L 15/1815 704/257 |

FOREIGN PATENT DOCUMENTS

| | | |
|---|---|---|
| KR | 10-2019-0061706 | 6/2019 |
| KR | 10-2019-0064042 | 6/2019 |
| KR | 10-2020-0025532 | 3/2020 |
| KR | 10-2092300 | 3/2020 |
| KR | 10-2020-0119388 | 10/2020 |
| KR | 10-2021-0004803 | 1/2021 |

* cited by examiner

ELECTRONIC DEVICE AND METHOD TO CONTROL EXTERNAL APPARATUS

CROSS-REFERENCE TO RELATED APPLICATIONS

This application is a continuation of International Application No. PCT/KR2022/017076 designating the United States, filed on Nov. 2, 2022, in the Korean Intellectual Property Receiving Office and claiming priority to Korean Patent Application No. 10-2021-0180561, filed on Dec. 16, 2021, in the Korean Intellectual Property Office, and to Korean Patent Application No. 10-2021-0188764 filed on Dec. 27, 2021, in the Korean Intellectual Property Office, the disclosures of all of which are incorporated by reference herein in their entireties.

BACKGROUND

1. Field

The disclosure relates to an electronic device for controlling an external device.

2. Description of Related Art

Recently, many devices, such as air conditioners, TVs, and dryers, support actions through voice commands. For example, when a user utters a command such as "Lower the air conditioner temperature," "Turn on the TV to channel 11," and "Tell me when the drying is finished," each device converts the command into text and performs an action according to the user intent in response to execution. When these devices operate on one platform, the user must clearly say which device to execute the command (perform a single command) or set commands (perform a plurality of commands) for various combinations of devices in advance in the form of a quick command or the like to control several devices.

SUMMARY

Embodiments of the disclosure may provide an electronic device configured to indirectly discern the intent of a user utterance through a classification of a situation factor even when the user utterance intent is not discerned.

According to an example embodiment, the electronic device may include: a communication module comprising communication circuitry configured to establish wireless communication with a user terminal, a memory configured to store computer-executable instructions, and a processor configured to execute the computer-executable instructions by accessing the memory, and the instructions, when executed, cause the processor to: receive utterance data from the user terminal using the communication module, classify a situation factor based on the utterance data, determine one or more external devices that match the classified situation factor, and generate and present one or more action scenarios for the one or more external devices determined for the classified situation factor to the user terminal.

According to an example embodiment, a method implemented by a processor may include: receiving utterance data from a user terminal using a communication module, classifying a situation factor based on the utterance data, determining one or more external devices that match the classified situation factor, and generating and presenting one or more action scenarios for the one or more external devices determined for the classified situation factor to the user terminal.

According to various example embodiments, the electronic device may quickly convert a user situation (e.g., a negative situation) to another situation (e.g., a positive situation) by discerning the intent of the indirect utterance of the user and controlling an external device more flexibly in response to various utterances of the user.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
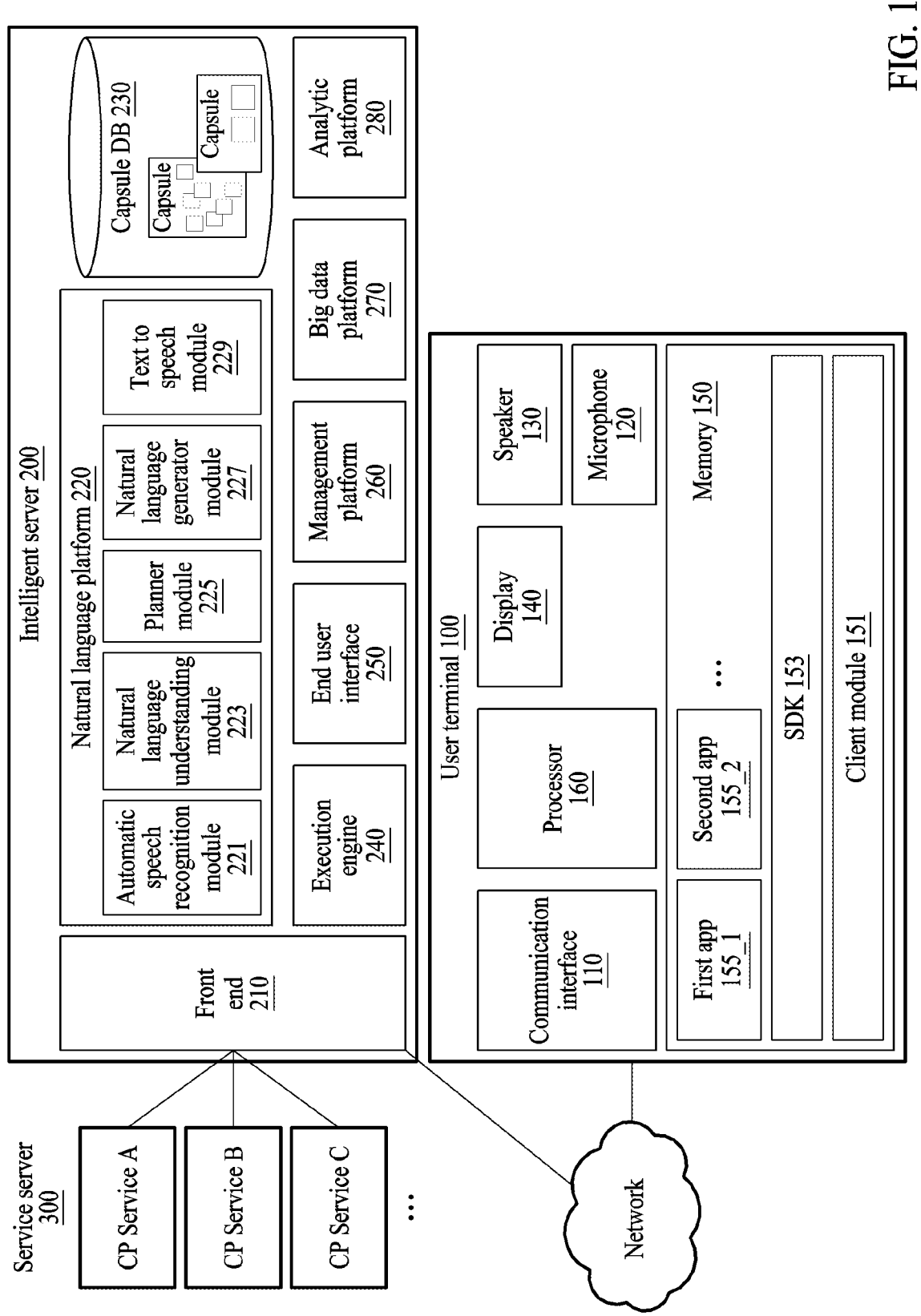
FIG. 1 is a block diagram illustrating an example configuration of an integrated intelligence system according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example configuration of an integrated intelligence system according to various embodiments.

Referring to FIG. 1, the integrated intelligence system 10 may include a user terminal 100, an intelligent server 200, and a service server 300.

The user terminal 100 may be a terminal device (or an electronic device) capable of connecting to the Internet, and may be, for example, a mobile phone, a smartphone, a personal digital assistant (PDA), a notebook computer, a TV, a large home appliance, a wearable device, a head-mounted display (HMD), or a smart speaker.

According to an embodiment, the user terminal 100 may include a communication interface (e.g., including communication circuitry) 110, a microphone 120, a speaker 130, a display 140, a memory 150, and/or a processor (e.g., including processing circuitry) 160. The components listed above may be operationally or electrically connected to each other.

The communication interface 110 may include various communication circuitry and be connected to an external device to transmit and receive data. The microphone 120 may receive sound (e.g., a user utterance) and convert it into an electrical signal. The speaker 130 may output the electrical signal as sound (e.g., a voice). The display 140 may be configured to display an image or a video. The display 140 may also display a graphic user interface (GUI) of an app (or an application program) to be executed.

The memory 150 may store a client module 151, a software development kit (SDK) 153, and a plurality of apps 155. The client module 151 and the SDK 153 may configure a framework (or a solution program) for performing general-purpose functions. In addition, the client module 151 or the SDK 153 may configure a framework for processing a voice input.

The plurality of apps 155 may be a program for performing a designated function. According to an embodiment, the plurality of apps 155 may include a first app 155_1 and a second app 155_2. According to an embodiment, each of the plurality of apps 155 may include a plurality of actions for performing a designated function. For example, the apps may include an alarm app, a messaging app, and/or a scheduling app. According to an embodiment, the plurality of apps 155 may be executed by the processor 160 to sequentially execute at least some of the plurality of actions.

The processor 160 may include various processing circuitry and control the overall action of the user terminal 100. For example, the processor 160 may be electrically connected to the communication interface 110, the microphone 120, the speaker 130, and the display 140 to perform a designated action.

The processor 160 may also execute a program stored in the memory 150 to perform a designated function. For example, the processor 160 may execute at least one of the client module 151 and the SDK 153 to perform the following action for processing voice input. The processor 160 may control, for example, an action of the plurality of apps 155 through the SDK 153. The following action described as an action of the client module 151 or the SDK 153 may be an action performed by execution of the processor 160.

The client module 151 may receive a voice input. For example, the client module 151 may receive a voice signal corresponding to a user utterance received by the microphone 120. The client module 151 may transmit the received voice input to the intelligent server 200. The client module 151 may transmit state information of the user terminal 100 with the received voice input to the intelligent server 200. The state information may be, for example, execution state information of an app.

The client module 151 may receive a result corresponding to the received voice input. For example, when the intelligent server 200 is capable of calculating a result corresponding to the received voice input, the client module 151 may receive the result corresponding to the received voice input. The client module 151 may display the received result on the display 140.

The client module 151 may receive a plan corresponding to the received voice input. The client module 151 may display the result of executing a plurality of actions of an app on the display 140 according to the plan. The client module 151 may, for example, sequentially display the results of executing the plurality of actions on the display. The user terminal 100 may display, as another example, only some results (e.g., the result of the last action) of executing the plurality of actions on the display.

According to an embodiment, the client module 151 may receive a request to obtain information necessary for calculating a result corresponding to the voice input from the intelligent server 200. According to an embodiment, the client module 151 may transmit the necessary information to the intelligent server 200 in response to the request.

The client module 151 may transmit information on the results of executing the plurality of actions according to the plan to the intelligent server 200. The intelligent server 200 may confirm that the received voice input has been correctly processed using the information on the results.

The client module 151 may include a speech recognition module. According to an embodiment, the client module 151 may recognize a voice input for performing a limited function through the speech recognition module. For example, the client module 151 may execute an intelligent app for processing a voice input to perform an organic operation through a designated input (e.g., Wake up!).

The intelligent server 200 may receive information related to a user voice input from the user terminal 100 through a communication network. According to an embodiment, the intelligent server 200 may change data related to the received voice input into text data. According to an embodiment, the intelligent server 200 may generate a plan for performing a task corresponding to the user voice input based on the text data. The plan may also be referred to as a scenario herein.

According to an embodiment, the plan may be generated by an artificial intelligence (AI) system. The AI system may be a rule-based system or a neural network-based system (e.g., a feedforward neural network (FNN) or a recurrent neural network (RNN)). The AI system may be a combination thereof or other AI systems. According to an embodiment, the plan may be selected from a set of predefined plans or may be generated in real time in response to a user request. For example, the AI system may select at least one plan among the predefined plans.

The intelligent server 200 may transmit a result according to a generated plan to the user terminal 100 or transmit the generated plan to the user terminal 100. According to an embodiment, the user terminal 100 may display a result according to the plan on the display. According to an embodiment, the user terminal 100 may display the result of executing an action according to the plan on the display.

The intelligent server 200 may include a front end 210, a natural language platform 220, a capsule database (DB) 230, an execution engine 240, an end user interface 250, a management platform 260, a big data platform 270, and/or an analytic platform 280, each of which may include various processing circuitry and/or executable program instructions.

The front end 210 may receive a voice input received from the user terminal 100. The front end 210 may transmit a response corresponding to the voice input. The front end 210 may include, for example, a communication module including various communication circuitry for establishing wireless communication with the user terminal.

The communication module may support establishing a direct (e.g., wired) communication channel or wireless communication channel between an electronic device and a user terminal, an external device, or a server, and performing communication through an established communication channel. The communication module may include one or more communication processors that operate independently from a processor (e.g., an application processor) and support direct (e.g., wired) communication or wireless communication. According to an embodiment, the communication module may include a wireless communication module (e.g., a cellular communication module, a short-range wireless communication module, or a global navigation satellite system (GNSS) communication module) or a wired communication module (e.g., a local area network (LAN) communication module, or a power line communication (PLC) module). A corresponding communication module among these communication modules may communicate with an external user terminal and/or an external device through a first network (e.g., a short-range communication network such as Bluetooth, wireless fidelity (WiFi) direct, or infrared data association (IrDA)) or a second network (e.g., a long-range communication network such as a legacy cellular network, a 5G network, a next-generation communication network, Internet, or a computer network (e.g., a local area network (LAN) or a wide area network (WAN))). These various types of communication modules may be integrated into one component (e.g., a single chip) or may be implemented as a plurality of separate components (e.g., a plurality of chips).

According to an embodiment, the natural language platform 220 may include an automatic speech recognition (ASR) module 221, a natural language understanding (NLU) module 223, a planner module 225, a natural language generator (NLG) module 227, and/or a text to speech (TTS) module 229, each of which may include various processing circuitry and/or executable program instructions.

The ASR module 221 may convert a voice input received from the user terminal 100 into text data. The NLU module 223 may discern the intent of the user using the text data of the voice input. For example, the NLU module 223 may discern the intent of the user by performing syntactic analysis or semantic analysis. The NLU module 223 may discern the meaning of a word extracted from the voice input using a linguistic feature (e.g., a grammatical element) of a morpheme or phrase, and determine the intent of the user by matching the discerned meaning of the word to an intent.

The planner module 225 may generate a plan using a parameter and the intent determined by the NLU module 223. The planner module 225 may be referred to as a scenario generator herein. According to an embodiment, the planner module 225 may determine a plurality of domains required to perform a task based on the determined intent. The planner module 225 may determine a plurality of actions included in each of the plurality of domains determined based on the intent. According to an embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 that stores a set of relationships between concepts and actions.

The NLG module 227 may change designated information into text form. The information changed to text form may be in the form of a natural language utterance. The TTS module 229 may change the information in text form into information in speech form.

According to an embodiment, some functions or all functions of the natural language platform 220 may also be implemented in the user terminal 100.

The capsule DB 230 may store information on the relationship between the plurality of concepts and actions corresponding to the plurality of domains. A capsule according to an embodiment may include a plurality of action objects (or action information) and concept objects (or concept information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the voice input. According to an embodiment, the capsule DB 230 may include a follow-up registry that stores information on follow-up actions for suggesting a follow-up action to the user in a designated situation. The follow-up action may include, for example, a follow-up utterance. According to an embodiment, the capsule DB 230 may include a layout registry that stores layout information of information output through the user terminal 100. According to an embodiment, the capsule DB 230 may include a vocabulary registry that stores vocabulary information included in capsule information. According to an embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an embodiment, the capsule DB 230 may also be implemented in the user terminal 100.

The execution engine 240 may calculate a result using the generated plan. The end user interface 250 may transmit the calculated result to the user terminal 100. Accordingly, the user terminal 100 may receive the result and provide the received result to the user. The management platform 260 may manage information used in the intelligent server 200. The big data platform 270 may collect data of the user. The analytic platform 280 may manage the quality of service (QoS) of the intelligent server 200. For example, the analytic platform 280 may manage the components and processing rate (or efficiency) of the intelligent server 200.

The service server 300 may provide a service (e.g., food order or hotel reservation) designated to the user terminal 100. According to an embodiment, the service server 300 may be a server operated by a third party. The service server 300 may provide information to be used for generating a plan corresponding to the received voice input to the intelligent server 200. The provided information may be stored in the capsule DB 230. In addition, the service server 300 may provide result information according to the plan to the intelligent server 200.

In the integrated intelligence system 10 described above, the user terminal 100 may provide various intelligent services to the user in response to a user input. The user input may include, for example, an input through a physical button, a touch input, or a voice input.

In an embodiment, the user terminal 100 may provide a speech recognition service through an intelligent app (or a speech recognition app) stored therein. In this case, for example, the user terminal 100 may recognize a user utterance or a voice input received through the microphone and provide a service corresponding to the recognized voice input to the user.

In an embodiment, the user terminal 100 may perform a designated action alone or with the intelligent server and/or the service server based on the received voice input. For example, the user terminal 100 may execute an app corresponding to the received voice input and perform a designated action through the executed app.

In an embodiment, when the user terminal 100 provides a service with the intelligent server 200 and/or the service server, the user terminal may detect a user utterance using the microphone 120 and generate a signal (or voice data) corresponding to the detected user utterance. The user terminal may transmit the voice data to the intelligent server 200 using the communication interface 110.

The intelligent server 200 according to an embodiment may generate a plan for performing a task corresponding to the voice input or a result of performing an action according to the plan in response to the voice input received from the user terminal 100. The plan may include, for example, a plurality of actions for performing a task corresponding to a voice input of the user, and a plurality of concepts related to the plurality of actions. The concepts may define parameters input for the execution of the plurality of actions or result values output by the execution of the plurality of actions. The plan may include connection information between the plurality of actions and the plurality of concepts.

The user terminal 100 may receive the response using the communication interface 110. The user terminal 100 may output a voice signal generated in the user terminal 100 to the outside using the speaker 130 or may output an image generated in the user terminal 100 to the outside using the display 140.

Figure 2:
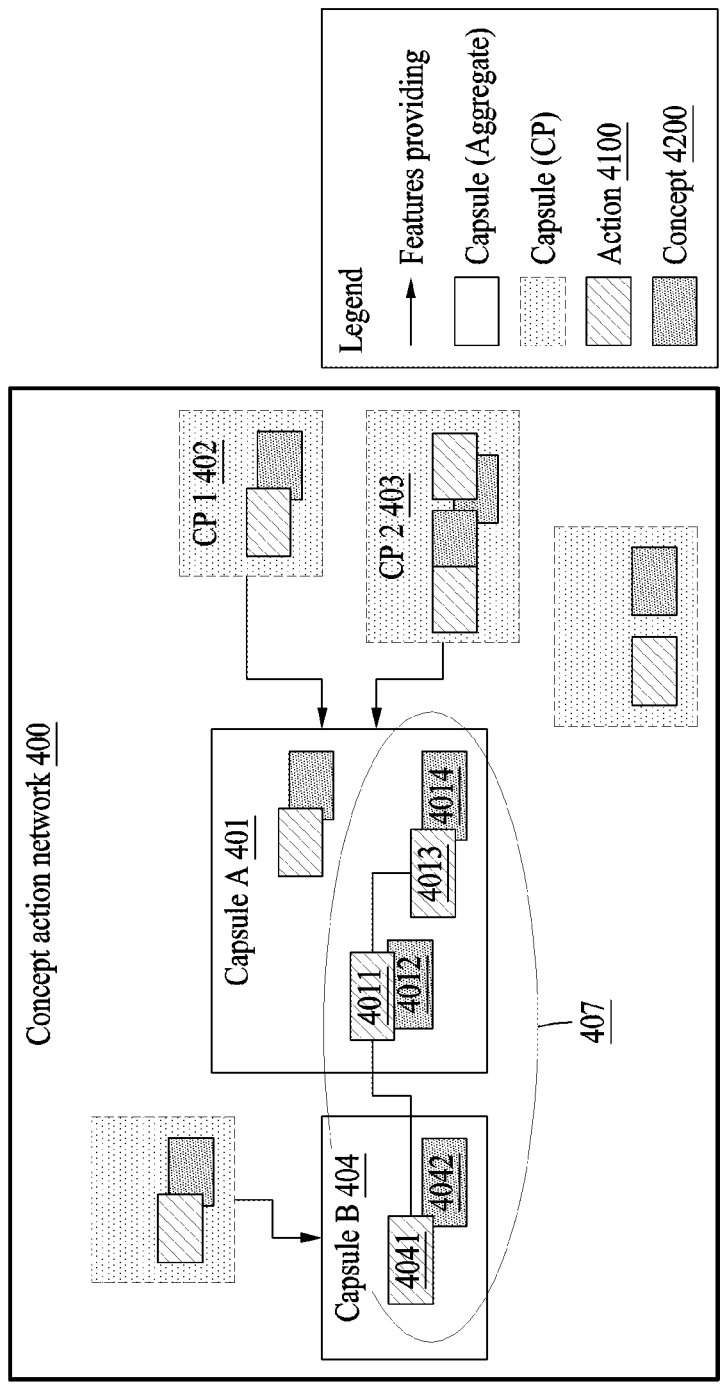
FIG. 2 is a diagram illustrating a form in which relationship information between a concept and an action is stored in a database according to various embodiments.

FIG. 2 is a diagram illustrating a form in which relationship information between a concept and an action is stored in a database according to various embodiments.

A capsule DB (e.g., the capsule DB 230) of the intelligent server 200 may store capsules in the form of a concept action network (CAN). The capsule DB may store an action for processing a task corresponding to a voice input of a user and a parameter necessary for the action in the form of a CAN.

The capsule DB may store a plurality of capsules (capsule A 401, capsule B 404) corresponding to each of a plurality of domains (e.g., an application) in the concept action network 400. According to an embodiment, one capsule (e.g., the capsule A 401) may correspond to one domain (e.g., a location (geo) or an application). In addition, one capsule may correspond to at least one service provider (e.g., CP 1 402 or CP 2 403) for performing a function for a domain related to the capsule. According to an embodiment, one capsule may include at least one or more actions 4100 and at least one or more concepts 4200 for performing a designated function.

The natural language platform 220 may generate a plan for performing a task corresponding to the received voice input using the capsules stored in the capsule DB. For example, the planner module 225 of the natural language platform 220 may generate the plan using the capsules stored in the capsule DB. For example, a plan 407 may be generated using actions 4011 and 4013 and concepts 4012 and 4014 of a capsule A 401 and an action 4041 and a concept 4042 of a capsule B 404. The natural language platform 220 may be included in a voice assistant.

Figure 3:
FIG. 3 is a diagram illustrating a user terminal displaying a screen for processing voice input received through an intelligent app according to various embodiments.

FIG. 3 is a diagram illustrating a user terminal displaying a screen for processing voice input received through an intelligent app according to various embodiments.

The user terminal 100 may execute an intelligent app to process a user input through the intelligent server 200.

According to an embodiment, when the user terminal 100 recognizes a designated voice input (e.g., Wake up!) or receives input through a hardware key (e.g., a dedicated hardware key), an intelligent app for processing the voice input may be executed on the screen 310. For example, the user terminal 100 may execute the intelligent app in a state of executing a scheduling app. According to an embodiment, the user terminal 100 may display an object 311 (e.g., an icon) corresponding to the intelligent app on the display 140. According to an embodiment, the user terminal 100 may receive a voice input by a user utterance. For example, the user terminal 100 may receive a voice input of "Tell me the schedule for this week." According to an embodiment, the user terminal 100 may display a user interface (UI) 313 (e.g., an input window) of the intelligent app in which text data of the received voice input is displayed on the display.

According to an embodiment, the user terminal 100 may display on a screen 320 a result corresponding to the received voice input to the display. For example, the user terminal 100 may receive a plan corresponding to the received user input and display a "The schedule for this week is" on the display according to the plan.

The electronic devices according to various example embodiments may be various types of electronic devices. The electronic devices may include, for example, a portable communication device (e.g., a smartphone), a computer device, a portable multimedia device, a portable medical device, a camera, a wearable device, or a home appliance device. The electronic device according to an embodiment is not limited to the above-described devices, and the electronic device is mainly described as an intelligent server (e.g., the intelligent server 200 of FIG. 1).

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various example embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively, or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 4:
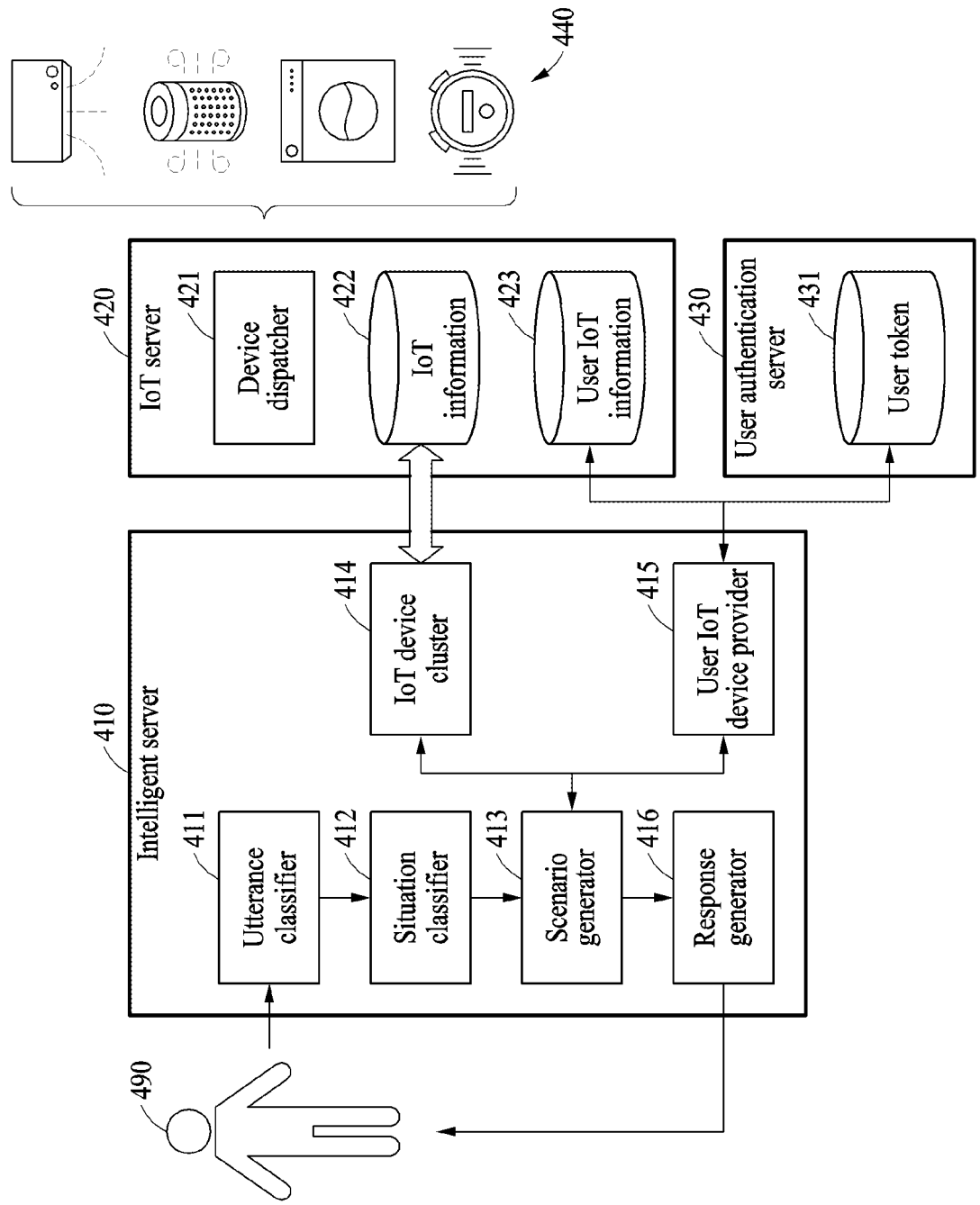
FIG. 4 is a block diagram illustrating an example configuration of an electronic device according to various embodiments.

FIG. 4 is a block diagram illustrating an example configuration of an electronic device according to various embodiments.

An electronic device 410 according to an embodiment may be implemented as an intelligent server (e.g., the intelligent server 200 of FIG. 1). For example, the electronic device 410 may include an utterance classifier 411 (e.g., the speech recognition module 221 and the natural language understanding module 223 of FIG. 1), a situation classifier 412, a scenario generator 413 (e.g., the planner module 225 in FIG. 1), an Internet of things (IoT) device cluster 414, a user IoT device provider 415, and a response generator 416 (e.g., the natural language generator module 227 in FIG. 1), each of which may include various processing circuitry and/or executable program instructions. The utterance classifier 411, the situation classifier 412, the scenario generator 413, the IoT device cluster 414, the user IoT device provider 415 and the response generator 416 may be a module, but each action is not limited to being performed by the module. Each action may be performed by a processor of the electronic device 410. The utterance classifier 411 and the situation classifier 412 may be individually implemented as a machine learning model but are not limited thereto.

The electronic device 410 may receive utterance data of a user 490 from a user terminal using the communication module. The utterance data is data representing an utterance of the user 490 and may be, for example, data including a voice signal corresponding to the utterance. However, the utterance data is not limited thereto and may include text data indicating the utterance content of the user 490 converted by the ASR module 221 described in FIG. 2.

The utterance classifier 411 may classify the intent of the utterance of the user 490 from the utterance data. For example, a processor of the electronic device 410 may determine the intent of the utterance of the user 490 from the utterance data and identify the control target device intended from the utterance data. The control target device may represent a device that the user 490 intends to control through the utterance. The intent of the utterance may represent an action and/or a function that the user 490 intends to control through the utterance, and further, the intent of the utterance may also include indicating the control target device. As will be described in greater detail below, in response to a case in which the intent of the utterance of the user 490 and the control target device are identified, the electronic device 410 may generate a scenario (e.g., a plan) for executing the control target device in a plurality of actions determined by the intent of the user 490 through the scenario generator 413 as described in FIG. 2. The electronic device 410 may control an external device 440 through a device dispatcher 421 of an IoT server 420 when a discerned utterance intent of the user 490 is a command for controlling a device. The device dispatcher 421 may manage and control the external device 440. For example, the electronic device 410 may receive utterance data including "Turn on the air conditioner" from the user terminal, identify the air conditioner as a control target device from the utterance data, and identify activation of the air conditioner as the intent of the utterance. The electronic device 410 may perform a scenario of activating the identified air conditioner based on the utterance data. The external device 440 is a control target device according to an action scenario determined based on an analysis of the utterance, and may include, for example, a home appliance and an IoT device.

In the electronic device 410, when the user 490 provides an utterance with unclear intent, the utterance classifier 411 may fail to classify intent from the utterance data. For another example, even though the intent of the utterance is clear, the electronic device 410 may fail to identify a control target device. The electronic device 410 according to an embodiment may attempt to interpret the utterance data in another aspect through the situation classifier 412.

In addition, the electronic device 410 may attempt to interpret the utterance data in another aspect through the situation classifier 412 regardless of the classification of the intent. For example, when a control target device and the intent of the utterance to control the control target device are identified from the utterance data, the electronic device 410 may search for a scenario that matches the identified control target device and the intent of the utterance. The electronic device 410 may further provide an additional scenario (e.g., an action scenario) determined based on the situation factor classified as described later, while providing a scenario that matches the control target device and the intent of the utterance.

The situation classifier 412 may classify a situation indicated by utterance data even when the intent of the utterance of the user 490 and a control target device are not identified. For example, the electronic device 410, in response to a case in which at least one of the intent of the utterance and a control target device is not identified from the utterance data, may classify a situation factor for the user 490 based on the utterance data. The situation factor may represent the factor that caused the situation of the user 490 who provided the utterance data. Herein, a negative situation factor is mainly described as an example of a situation factor. For example, the negative situation factor may represent a factor that caused the negative situation of the user 490 who provided the above-described utterance data. The electronic device 410 may indirectly estimate the intent of the utterance of the user 490 implied in the utterance data by inferring the situation factor from the utterance data. Table 1 below describes examples of situation factors.

TABLE 1

| Situation Factor | Details | Example of Utterance |
| --- | --- | --- |
| Weather factor | Hot weather | "Oh, it's too hot." |
| | | "I'm sweating." |
| | | "I hate summer." |
| | | "It's sticky." |
| | | "I hope winter comes soon." |
| | Cold weather | "Oh, it's cold." |
| | | "I feel chilly." |
| | | "I hate winter." |
| Mood factor | Bored | "What should I do?" |
| | | "I have nothing to do." |
| | | "I'm bored." |
| | | "Who should I play with?" |
| | Annoyed | "I'm annoyed." |
| | | "Something bad happened." |
| | | "I don't want to think about anything." |
| | | "Don't touch me." |
| Cleanliness factor | Dirty | "How do I clean all this up?" |
| | | "It's messy." |

TABLE 1-continued

| Situation Factor | Details | Example of Utterance |
| --- | --- | --- |
| | | "Look at all the dust!" |
| | | "Look at all the dog hair!" |

The situation factor may represent a factor that causes a situation (e.g., a negative situation) of the user in terms of including the body, mind, and emotion of the user 490. In Table 1, the situation factor (e.g., a negative situation factor) may include, for example, a weather factor, a mood factor, and a cleanliness factor. The weather factor is a weather condition that causes a situation of the user 490 and may include, for example, hot weather and cold weather. However, the weather factor is not limited thereto, and may include wet weather and dry weather. The mood factor is a mood state that causes a situation of the user 490 and may include, for example, bored and annoyed. However, the mood factor is not limited thereto, and may include an emotional state including anger, sadness, anxiety, hurt, and embarrassment. The cleanliness factor is a cleanliness state that causes a situation of the user 490 and may include a dirty state of the surrounding environment of the user 490, a dirty state of the user 490, and a dirty state of a person and an object (e.g., an animal). However, the situation factor is not limited to Table 1 above, and the negative situation factor may include a stress factor, and the situation factor may include not only negative situation factors but also various situation factors, and may vary depending on the design.

The electronic device 410 may classify the situation factor from the utterance data into at least one of a weather factor, a mood factor, and a cleanliness factor that may cause a situation of the user 490. Herein, an example of classifying a single situation factor from one utterance data is mainly described, but the present disclosure is not limited thereto, and the electronic device 410 may classify a plurality of situation factors from the utterance data. The electronic device 410 may interpret a complex situation from the utterance data. The situation classifier 412 may analyze the utterance of the user 490 with a classification criterion different from that of the utterance classifier 411. The electronic device 410 may discern a mood or feeling of the user 490 from an utterance text of the user 490 through a classification of the above-described situation factors. The electronic device 410 may classify a current state of the user 490 based on the mood implied in the utterance and/or the situation of the user 490 rather than a domain, an intent, and a parameter value of the user 490. For example, the electronic device 410 may receive utterance data lacking a clear utterance intent, such as "I'm frustrated" from the user terminal. The electronic device 410 may classify an anger factor (e.g., frustrated) as a situation factor from utterance data of "I'm frustrated."

The scenario generator 413 may generate a scenario based on the situation factor classified by the situation classifier 412 described above. For example, the scenario generator 413 may identify a candidate device group capable of supporting a currently classified situation factor through the IoT device cluster 414. In addition, the scenario generator 413 may obtain a list of devices registered in the user terminal and a state of the registered device through the user IoT device provider 415. The scenario generator 413 may identify the external device 440 available for the user terminal among the supportable candidate device groups.

For example, the electronic device 410 may determine one or more external devices 440 that match the classified situation factor. The electronic device 410 may identify a candidate device group capable of supporting the classified situation factor. The electronic device 410 may search for the candidate device group that matches the situation factor classified from the utterance data based on the IoT information 422 registered in the IoT server 420. The candidate device group will be described in greater detail below with reference to FIG. 5. The electronic device 410 may transmit the classified situation factor to the IoT server 420 and request a reply from the candidate device group capable of supporting the situation factor. However, it is not limited thereto, and the electronic device 410 may receive IoT information 422 from the IoT server 420 and search for a type of device belonging to the candidate device group capable of supporting the situation factor among the received IoT information 422. The IoT information 422 may include information about a device (e.g., the IoT device) having an action and/or a function for assisting the user. The external device may be classified according to device types and the device type may be clustered into the candidate device group. The device type and the candidate device group is described in greater detail below with reference to FIG. 5.

The electronic device 410 may determine an external device 440 available to the user 490 among candidate device groups. For example, the electronic device 410 may search for a device registered in the user terminal among devices belonging to the candidate device group. The electronic device 410 may determine a device capable of controlling an action and/or a function of the corresponding device among devices registered in the user terminal as an available external device 440. For example, the available external device 440 may include a device having a current connection with the user terminal, a turned-on device, and a turn-onable device among devices registered in the user terminal. The electronic device 410 may attempt user authentication of the user terminal through a user authentication server 430. When the electronic device 410 succeeds in the user authentication requested by the user terminal, a user token 431 (e.g., a unique key) corresponding to the user 490 may be obtained. The electronic device 410 may obtain information for a device registered in the user terminal using the unique key of the user 490. The electronic device 410 may receive user IoT information 423 registered in a user account for which user authentication is successful from the IoT server 420. The user IoT information 423 may include a list of devices registered in the user account and a state of the registered devices. The state of the device may include whether the device is powered and an action mode. For reference, the device registered in the user terminal may be, for example, a device registered to be accessible from a voice assistant of the user terminal.

The electronic device 410 may generate one or more action scenarios for one or more external devices 440 determined for the classified situation factor. The electronic device 410 may present one or more generated action scenarios to the user terminal. For example, the scenario generator 413 may determine an action scenario executable for a state of the external device 440 available in the user terminal among predetermined candidate scenarios for the candidate device group that matches the situation factor classified from the situation classifier 412. The electronic device 410 may determine one of a plurality of candidate scenarios or a combined scenario of two or more as an action scenario. The scenario generator 413 may provide a generated action scenario to the response generator 416. The response generator 416 may transmit response data according to the generated scenario to the user terminal. The response data may include content (e.g., text, images, and/or voice) that asks a user about the execution of the generated action scenario.

In the above-described example, when the situation factor is classified as an anger factor (e.g., "Frustrated"), the electronic device 410 may obtain a recommendable device candidate group for the situation caused by the anger factor from IoT device cluster 414. The electronic device 410 may generate an action scenario in which an air conditioner is operated in a clean mode and classical music is played in an audio device based on a state of the external device 440 available to the user terminal among the device candidate groups. The electronic device 410 may transmit response data including content that inquires and suggests, "Would you like to change the air conditioner to clean mode and play classical music?" to the user terminal. The user terminal may visually, audibly, and/or tactilely output the response data received from the electronic device 410.

As another example, the electronic device 410 may receive utterance data including "Oh, it's too hot," "I'm sweating," "I hate summer," "It's sticky," or "I hope winter comes soon" from the user terminal. As described above in Table 1, the electronic device 410 may classify the situation factor as a weather factor such as hot weather. The electronic device 410 may select a temperature control device group as a device candidate group capable of supporting hot weather. The electronic device 410 may determine the air conditioner as an external device 440 available to the user terminal among the temperature control device groups. The electronic device 410 may generate an action scenario for turning on the air conditioner. In order to recommend execution of the above-described action scenario, the electronic device 410 may transmit response data asking "The weather is too hot. Should I turn on the air conditioner?" to the user terminal.

Accordingly, the electronic device 410 according to an embodiment may indirectly discern the intent of the utterance of the user 490 through classification of the above-described situation factor even when the intent of the utterance of the user 490 is not discerned. For example, the utterance data of "Why is the house so messy?" may imply that the user 490 wants to clean the house and is in a bad mood because the current state of the house of the user 490 is not organized. The electronic device 410 may discern the current mood or feeling of the user 490 and recommend and/or suggest an action scenario of devices (e.g., IoT devices as external devices 440) connected to a voice assistant executed on the user terminal, even when the user 490 does not make a clear utterance about device control. In the above-described example, "robot cleaner" and "air purifier" may be registered and connected to the voice assistant of the user 490. The electronic device 410 may classify the situation factor as a cleanliness factor indicating dirty from the utterance data of "Why is the house so messy?" of the user 490. The electronic device 410 may suggest response data to the user terminal of "Do you want to clean the surroundings by operating the robot cleaner and refresh your mood with the air purifier?" with respect to the cleanliness factor. When the suggested response data is approved by the user terminal (e.g., when the user 490 commands execution), the electronic device 410 may instruct an action of the robot cleaner and the air purifier via the IoT server 420 described above. Accordingly, the electronic device 410 may provide the user 490 with assistance from various devices through the voice assistant in various situations without certain device control utterance. For example, the electronic device 410 may recommend and present a predefined (e.g., specified) function to the user 490 based on the classification criterion according to the situation factor.

Figure 5:
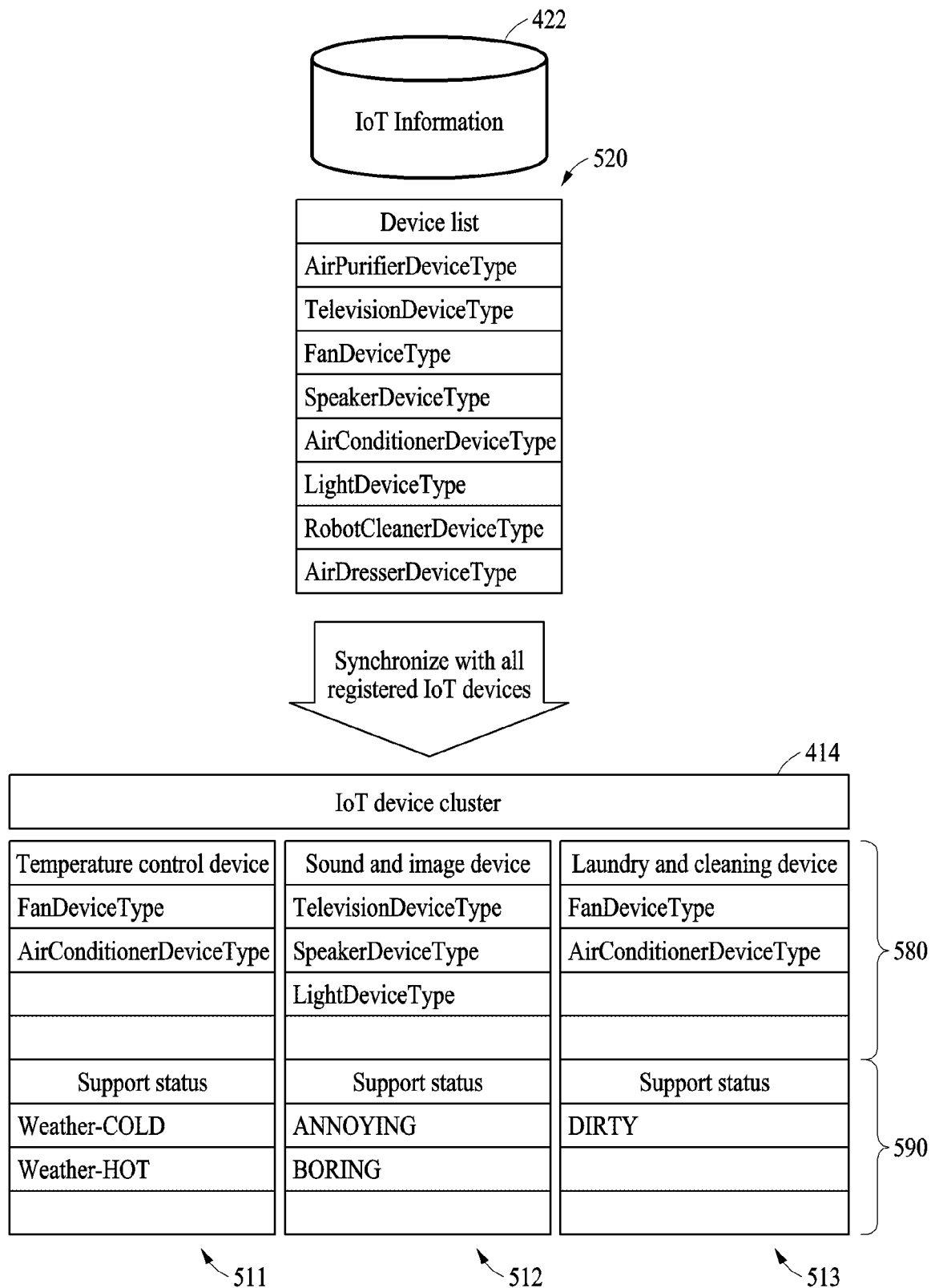
FIG. 5 is a diagram illustrating a candidate device group capable of supporting a classified situation factor according to various embodiments.

FIG. 5 is a diagram illustrating an example candidate device group capable of supporting a classified situation factor according to various embodiments.

The IoT information 422 may include a device type of a released device (e.g., a home appliance). For example, the IoT information 422 may include a device type designated and mapped to the device according to an action and/or a function of the device by each device and the service provider. The IoT information 422 may be continuously updated by the service provider. In FIG. 5, a list 520 of device types in the IoT information 422 may include, for example, an air purifier type, a TV type, a fan type, a speaker device type, an air conditioner type, a lighting device type, a robot cleaner type, and an air dresser device type.

The IoT device cluster 414 may include information on a candidate device group 580 and classify and manage a situation factor 590 mapped to each device of the list 520 obtained from the IoT information 422. The device type may be clustered into the candidate device group 580 according to a function that the device belonging to the device type has in common and a situation factor that may be removed by the function. The electronic device may manage the candidate device group 580 in which the device type is clustered for each situation factor. In the example shown in FIG. 5, the candidate device group 580 may be categorized into a temperature control device group 511, a sound and image device group 512, and a laundry and cleaning device group 513. The electronic device may map, in each candidate device group 580, a situation factor (e.g., a negative situation factor that may be removed) that may be processed by a common action and/or function of devices of the device type belonging to the group. For example, the candidate device group 580 may be a candidate device group having an action and/or a function capable of converting a situation (e.g., a negative situation as a first situation) to another situation (e.g., a positive situation as a second situation) according to the situation factor mapped to the group. In the present disclosure, the candidate device is mainly described as a home appliance that assists the user life, but is not limited thereto. The candidate device may be a device having an action and/or a function capable of converting a situation of the user into another situation. The mapping between the candidate device group 580 and the situation factor, for example, may be generated and managed by a service provider. In the example shown in FIG. 5, the IoT device cluster 414 may map the temperature control device group 511 including a fan type (e.g., FanDeviceType) and an air conditioner type (e.g., AirConditionerDeviceType) to a weather factor (e.g., "Weather-HOT" and "Weather-COLD") among the situation factors.

For reference, the IoT server may update the IoT information 422 when a new product (e.g., a new home appliance) is released. The electronic device may receive an update on the new product from the IoT server. The electronic device may identify a device type of the updated new product and map the candidate device group 580 to which the device type belongs. Accordingly, even when a new product is released, the electronic device may identify the device type of the product, and immediately map and manage the candidate device group 580 to which the identified device type belongs.

According to an embodiment, the electronic device may determine one or more devices capable of converting a situation caused by the classified situation factor into another situation as one or more external devices that match the classified situation factor.

For example, the one or more external devices may include one or a combination of two or more of a temperature control device, an audio device, a video device, a lighting device, an air purifier, a home appliance for laundry, and a cleaner. The temperature control device is a device capable of controlling a temperature and may include an air conditioner and a heater. The audio device is a device that outputs audio and may include a CD player. The video device is a device that outputs video and may include a DVD player. The lighting device is a device that outputs light and may include a device having a light emitting diode (LED) module. The air purifier may be a device having a function of purifying air. The home appliance for laundry may include a washing machine (e.g., a washer), a drying machine (e.g., a dryer), and a clothing care machine (e.g., an air dresser). The cleaner may include a robot cleaner. In the above-described example, the temperature control device group 511 may include a temperature control device. The sound and image device group 512 may include an audio device and a video device. The laundry and cleaning device group 513 may include an air purifier, a home appliance for laundry, and a cleaner.

According to an embodiment, the electronic device may select the candidate device group 580 capable of supporting the situation factor classified from utterance data as described above. The electronic device may select one external device among the selected device groups.

For example, when the classified situation factor includes a weather factor, the electronic device may select the temperature control device group 511 as a candidate device group 580 capable of supporting the weather factor. The electronic device may determine the temperature control device belonging to the temperature control device group 511 capable of supporting the weather factor as one or more external devices. As another example, when the classified situation factor includes a mood factor, the electronic device may select the sound and image device group 512 as a candidate device group 580 capable of supporting the mood factor. The electronic device may determine one or a combination of two or more of an audio devices, a video device, and a lighting device as one or more external devices in the sound and image device group 512. For another example, when the classified situation factor includes a cleanliness factor, the electronic device may select the laundry and cleaning device group 513 as a candidate device group 580 capable of supporting the cleanliness factor. The electronic device may determine one or a combination of two or more of an air purifier, a home appliance for laundry, and a cleaner as one or more external devices in the laundry and cleaning device group 513.

Figure 6:
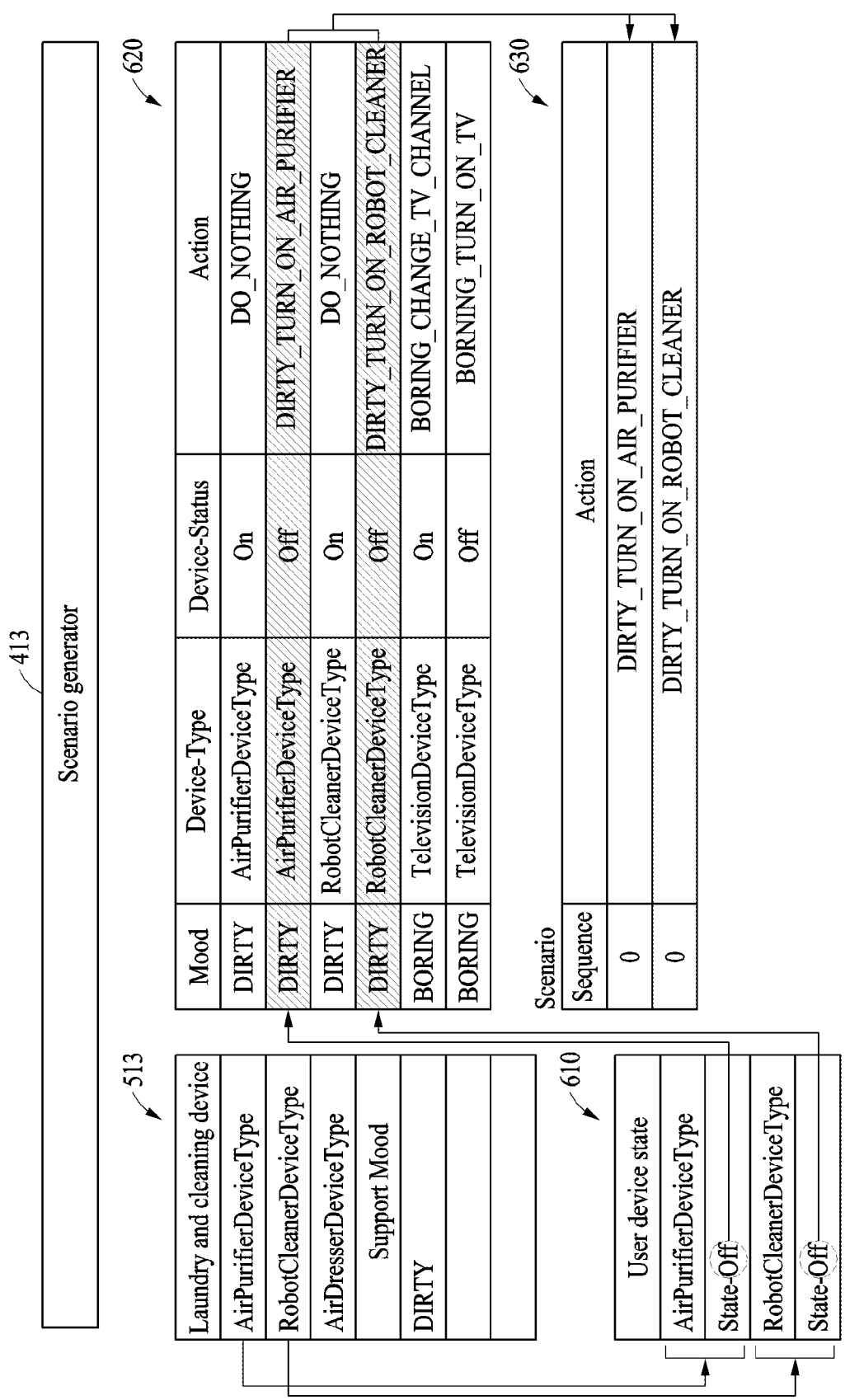
FIG. 6 is a diagram illustrating example generation of an action scenario based on a situation factor classified in the electronic device, a candidate device group, and a device state according to various embodiments.

FIG. 6 is a diagram illustrating generation of an action scenario based on a situation factor classified in the electronic device, a candidate device group, and a device state according to various embodiments.

The electronic device (e.g., the intelligent server 200 of FIG. 1) according to an embodiment may search to determine whether there is an available device 610 connected to the user terminal while belonging to the selected group. The available device 610 is a device capable of performing an action required to convert a situation (e.g., a negative situation) according to the situation factor to another situation (e.g., a positive situation), and may include, for example, a device registered in the user account, a device around the user, and a device around a location where the required action should be executed. For example, the situation factor classified in the example shown in FIG. 6 may be "dirty" as a cleanliness factor. The electronic device may select the laundry and cleaning device group 513 mapped to "dirty" as a device candidate group. The electronic device may determine whether a device belonging to the laundry and cleaning device group 513 is connected to the user terminal and whether the device is available. The electronic device may search for a device belonging to the identified device candidate group among devices registered in the user account. For example, the scenario generator 413 may recognize an air purifier type device and a robot cleaner type device belonging to the laundry and cleaning device group 513 among devices registered in the user account. In addition, the scenario generator 413 may collect a device in which a state of the available device 610 registered in the user account is in an inactive state (e.g., an Off state).

When an available device 610 is found, the electronic device may determine the available device 610 as an external device. The scenario generator 413 may determine the air purifier and the robot cleaner as external devices to be included in the generation of the action scenario 630.

The scenario generator 413 may collect a situation factor classified from utterance data of the user, a matched device candidate group, and an external device of the user registered in the voice assistant, and the state of the device. The scenario generator 413 may generate a device control scenario to be suggested to the user based on the collected information. In FIG. 6, as described previously, the electronic device may classify the cleanliness factor as a situation factor from the utterance data expressing the intent of "dirt" (e.g., "How do I clean all this up?"), and determine an air purifier and a robot cleaner as external devices among device candidate groups mapped to the cleanliness factor.

According to an embodiment, the electronic device may present an action scenario 630 corresponding to a state of one or more external devices among predetermined candidate scenarios 620 for one or more external devices matched with the situation factor.

The electronic device may store a predefined action for each situation factor and device type classified by the scenario generator 413. For example, when the external device matched to the classified situation factor and registered in the user terminal is turned off, the electronic device may generate an action scenario 630 for turning on the external device. However, the turn-on state and the turn-off state have been mainly described as states of the external device for convenience of description herein but are not limited thereto. Candidate scenarios may be prepared for a power state (e.g., a battery state), defective state (e.g., a normal operation or not) and various states of the external device.

For example, when the classified situation factor includes a cleanliness factor and the air purifier is available on the user terminal, the electronic device may instruct the air purifier to perform an air purifying action. In the example shown in FIG. 6, the candidate scenario 620 predefined for "dirty" as a cleanliness factor among the situation factors may include an action of turning on the air purifier in a turned-off state.

Similarly, when the classified situation factor includes the cleanliness factor and the cleaning device is available on the user terminal, the electronic device may instruct the cleaning device to perform a cleaning action. The candidate scenario 620 predefined for the cleanliness factor may include an action of turning on the robot cleaner in a turned-off state.

The candidate scenario 620 predefined for a case in which the air purifier and the robot cleaner are already turned on may include not performing an action even though the cleanliness factor is identified as a situation factor.

The candidate scenario 620 predefined for a mood factor (e.g., bored) as a situation factor may define an action of changing a channel of the video device (e.g., a TV) in a turn-on state and an action of turning on the video device in a turn-off state, respectively. The electronic device may generate an action scenario 630 using one of a plurality of candidate scenarios 620 or a combined scenario of two or more thereof.

In the example shown in FIG. 6, since the air purifier and the robot cleaner are turned off as available devices, the electronic device may generate an action scenario 630 including an action of turning on the air purifier and an action of turning on the robot cleaner.

However, the candidate scenario 620 and the action scenario 630 described in FIG. 6 are examples and are not limited thereto. For example, when the classified situation factor includes a mood factor and at least one of the audio and video devices is available in the user terminal, the electronic device may generate a scenario indicating a change (e.g., a change in a TV channel) of content played on at least one device. In addition to the description, the candidate scenario 620 may be prepared according to another situation factor, a type of available external device, and a state of available external devices, and the electronic device may select and combine the prepared candidate scenarios to generate an action scenario 630. The presentation of the generated action scenario 630 is described in FIG. 7 in the following.

Figure 7:
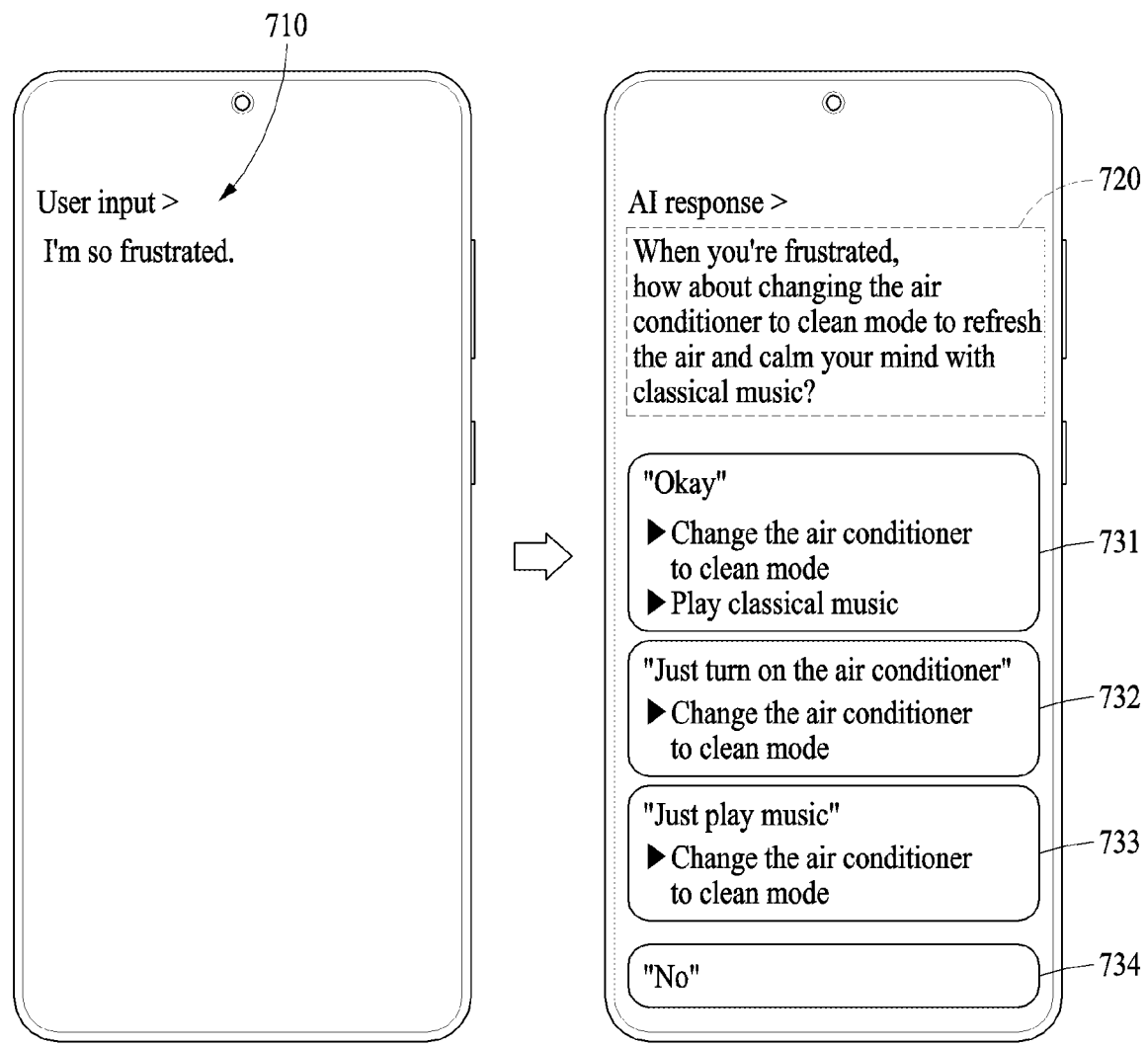
FIGS. 7 and 8 are diagrams illustrating an example of an action scenario generated according to various embodiments.
Figure 8:
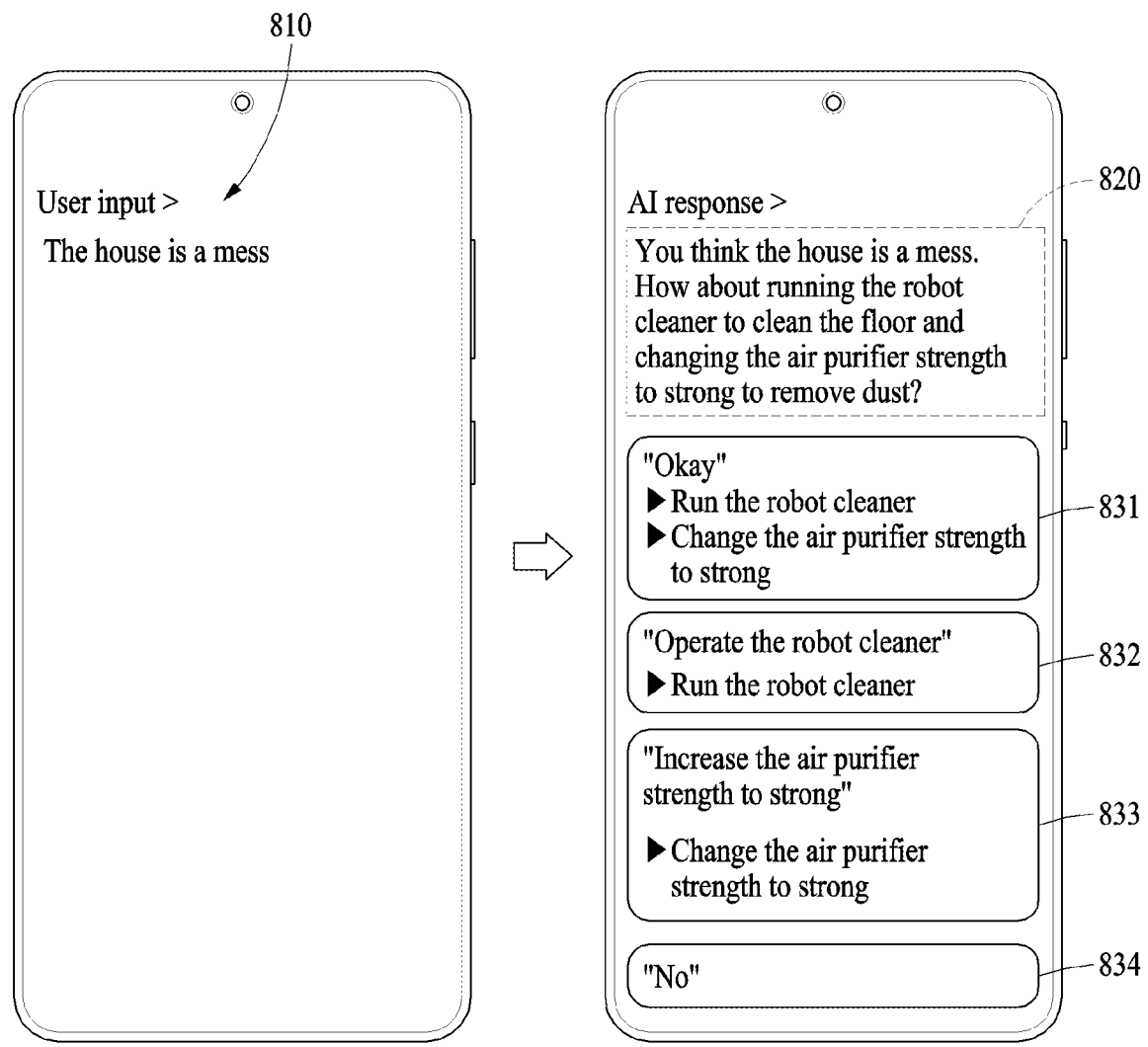

FIGS. 7 and 8 are diagrams illustrating example action scenarios generated according to various embodiments.

According to an embodiment, when a plurality of available external devices is matched with respect to the classified situation factor, the electronic device (e.g., the intelligent server 200 of FIG. 1) may present one or two more action scenarios of a scenario of operating all of a plurality of available external devices, a scenario of operating only some of the plurality of available external devices, and a scenario of not operating all external devices.

For example, in FIG. 7, the electronic device may classify a mood factor as a situation factor from utterance data 710 of "I'm so frustrated." The electronic device may determine an air conditioner and an audio device as available external devices that match the mood factor. The electronic device may present a scenario 731 of operating both the air conditioner and the audio device, a scenario 732 of operating only the air conditioner, a scenario 733 of operating only the audio device, and a scenario 734 of skipping an action of the external device to the user terminal. The user terminal may output an action scenario received from the electronic device with the available external device for the classified situation factor and response data 720 for guiding the performable action of the external device.

As another example, in FIG. 8, the electronic device may classify a cleanliness factor as a situation factor from utterance data 810 of "The house is a mess." The electronic device may determine the robot cleaner and the air purifier as available external devices that match the cleanliness factor. The electronic device may present a scenario 831 of operating both the robot cleaner and the air purifier, a scenario 832 of operating only the robot cleaner, a scenario 833 of operating only the air purifier, and a scenario 834 of skipping the action of external devices to the user terminal. The user terminal may output an action scenario received from the electronic device with the available external device for the classified situation factor and response data 820 for guiding the performable action of the external device.

According to an embodiment, the electronic device may transmit an instruction to perform an action according to a scenario selected on the user terminal among one or more generated action scenarios to the external device registered in the user terminal. For example, the electronic device may receive a selection of one action scenario among one or more action scenarios suggested from the user terminal. The electronic device may identify the external device corresponding to the selected action scenario and instruct each external device to perform an action included in the action scenario via the IoT server (e.g., the IoT server 420 of FIG. 4).

Figure 9:
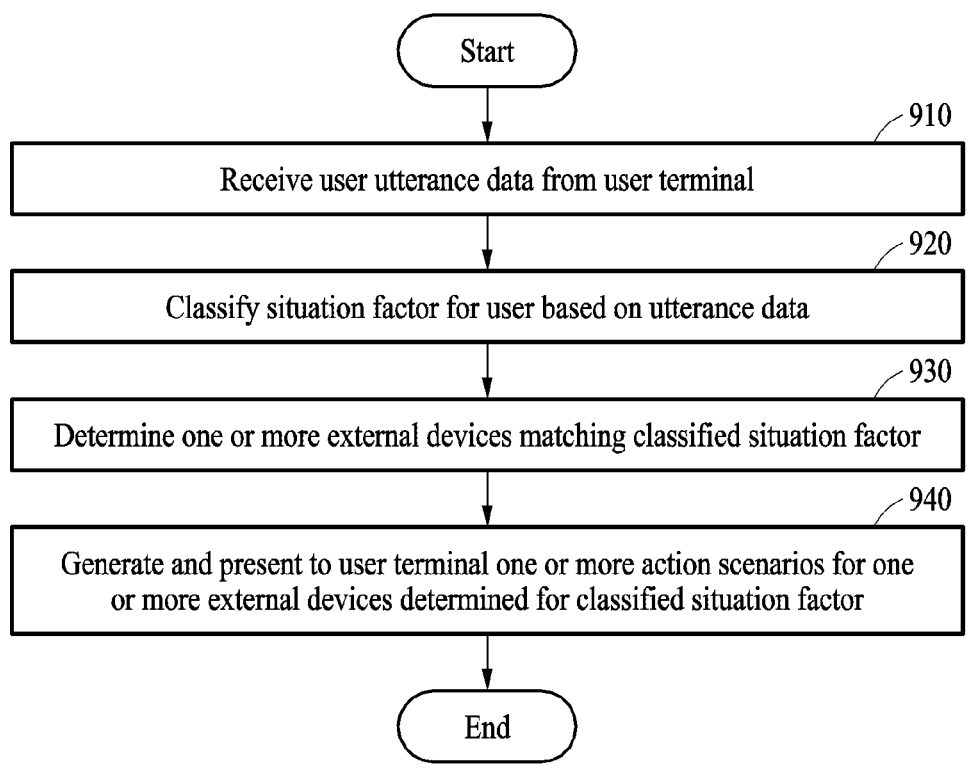
FIGS. 9 and 10 are flowcharts illustrating example methods of controlling an external device according to various embodiments.
Figure 10:
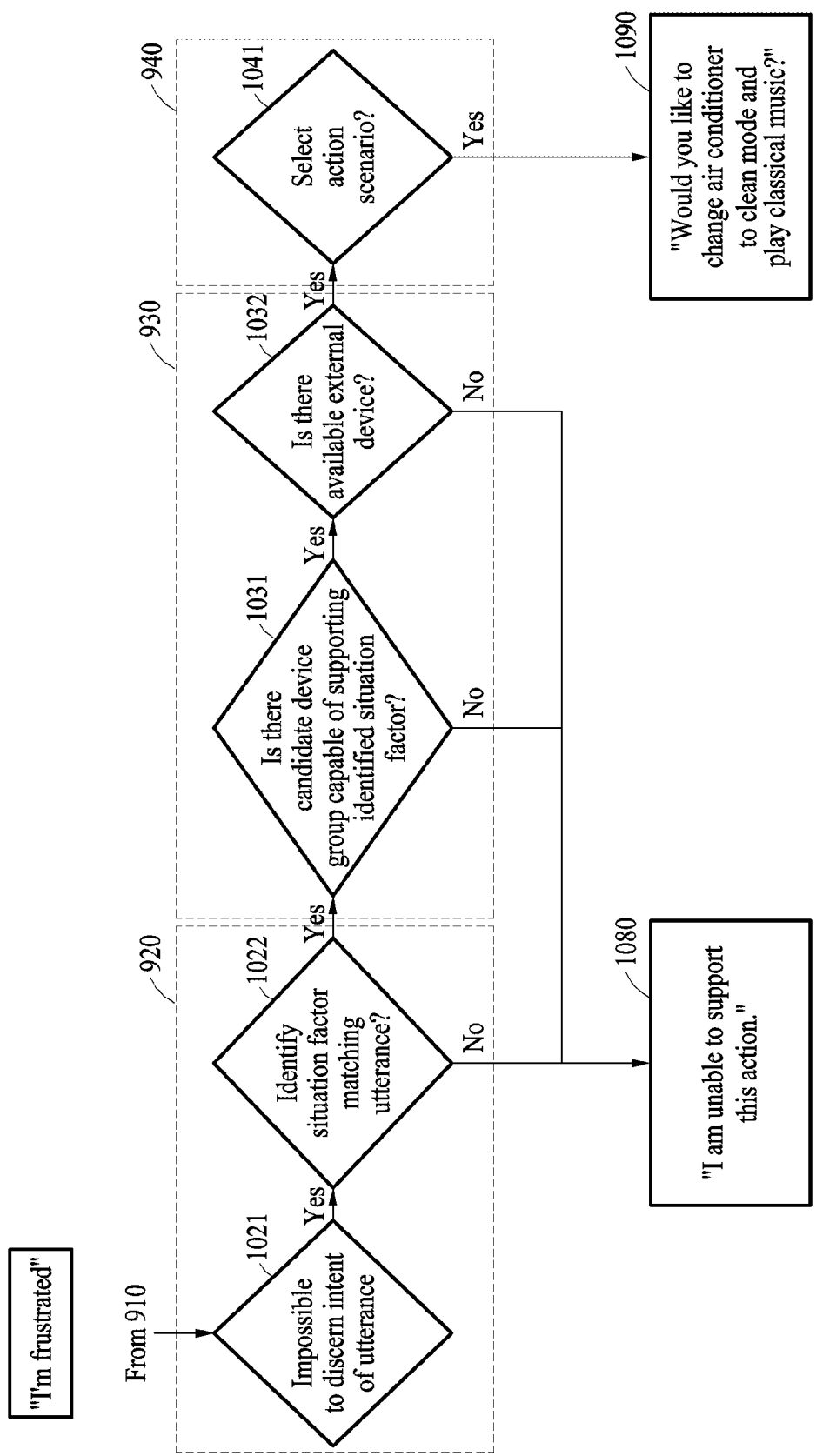

FIGS. 9 and 10 are flowcharts illustrating an example method of controlling an external device according to various embodiments.

In operation 910, the electronic device (e.g., the intelligent server 200 of FIG. 1) may receive utterance data of the user from the user terminal using the communication module.

In operation 920, the electronic device may classify a situation factor for the user based on the utterance data. For example, in response to a case in which at least one of the utterance intent the intent of the utterance and the control target device is not identified from the utterance data, the electronic device may classify the above-described situation factor from the utterance data. For example, in operation 1021, the electronic device may determine whether the utterance data is an utterance for which the intent may not be discerned. In operation 1022, when it is impossible to discern the intent, the electronic device may attempt to identify a situation factor that matches the utterance. In operation 1080, when the identification of the situation factor fails, the electronic device may terminate the action for controlling the external device while outputting a voice guiding the action failure (e.g., "I am unable to support this action.").

In operation 930, the electronic device may determine one or more external devices that match the classified situation factor. For example, in operation 1031, when a situation factor is identified from the utterance data, the electronic device may determine whether there is a candidate device group capable of supporting the identified situation factor. In operation 1032, when there is a supportable candidate device group, the electronic device may determine whether there is an external device available in the user terminal. For example, the electronic device may determine whether there is a device registered in the user account of the user terminal and whether the device is accessible. In operation 1080, when the search for a device candidate group capable of converting a first situation (e.g., a negative situation) into a second situation (e.g., a positive situation) different from the first situation fails or there is no available external device in the user account, the electronic device may terminate the action for controlling the external device.

In operation 940, the electronic device may generate and present one or more action scenarios for one or more external devices determined for the classified situation factors to the user terminal. For example, in operation 1041, when there is an external device available in the user terminal for the situation factor, the electronic device may generate an action scenario. As described above in FIG. 6, the electronic device may generate an action scenario by selecting and/or combining a matching scenario among candidate scenarios prepared for each situation factor, device type, and device state. In operation 1090, the electronic device may transmit response data to the user terminal asking whether to perform the generated action scenario. The user terminal may output the response data received from the electronic device.

The actions described in FIGS. 9 and 10 may be performed by a processor of the electronic device (e.g., the intelligent server 400 of FIG. 4) and are not limited to those performed in the above-described order. The actions described in FIGS. 9 and 10 may be performed in parallel or in time series with other actions and may be performed in an order different from the described order unless it is contrary to the description. In addition, the actions may be performed with the actions described in FIGS. 1 to 8.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a communication module comprising communication circuitry configured to establish wireless communication with a user terminal;
    a memory configured to store computer-executable instructions; and
    at least one processor, comprising processor circuitry, configured to execute the computer-executable instructions by accessing the memory,
    wherein the instructions, when executed, cause the at least one processor to perform, individually and/or collectively, acts including the following:
        receive utterance data from the user terminal using the communication module;
        classify a situation factor based at least partially on the utterance data;
        determine, from a plurality of external device types, one or more external devices that match the classified situation factor; and
        generate and present one or more action scenarios for the one or more external devices determined for the classified situation factor to the user terminal prior to implementation of a presented action scenario.

2. The electronic device of claim 1, wherein the instructions, when executed, cause the at least one processor, individually and/or collectively, to, in response to at least one of utterance intent and a control target device not being identified from the utterance data, classify the situation factor based on the utterance data.

3. The electronic device of claim 1, wherein the instructions, when executed, cause the at least one processor, individually and/or collectively, to:
    control the communication module to transmit an instruction to an external device registered in the user terminal to perform an action according to a scenario selected from the user terminal among the one or more generated action scenarios.

4. The electronic device of claim 1, wherein the instructions, when executed, cause the at least one processor, individually and/or collectively, to:
classify the situation factor into at least one of a weather factor, a mood factor, and a cleanliness factor that cause a situation.

5. The electronic device of claim 1, wherein the instructions, when executed, cause the at least one processor, individually and/or collectively, to:
determine one or more devices capable of converting a situation caused by the classified situation factor into another situation as the one or more external devices that match the classified situation factor.

6. The electronic device of claim 5, wherein the one or more external devices comprise:
one or a combination of two or more of a temperature control device, an audio device, a video device, a lighting device, an air purifier, a home appliance for laundry, and a cleaner.

7. The electronic device of claim 5, wherein the instructions, when executed, cause the at least one processor, individually and/or collectively, to,
based on the classified situation factor comprising a weather factor, determine a temperature control device as the one or more external devices.

8. The electronic device of claim 5, wherein the instructions, when executed, cause the at least one processor, individually and/or collectively, to,
based on the classified situation factor comprising a mood factor, determine one or a combination of two or more of an audio device, a video device, and a lighting device as the one or more external devices.

9. The electronic device of claim 5, wherein the instructions, when executed, cause the at least one processor, individually and/or collectively, to,
based on the classified situation factor comprising a cleanliness factor, determine one or a combination of two or more of an air purifier, a home appliance for laundry, and a cleaner as the one or more external devices.

10. The electronic device of claim 1, wherein the instructions, when executed, cause the at least one processor, individually and/or collectively, to:
present an action scenario corresponding to a state of the one or more external devices among specified candidate scenarios for the one or more external devices matched to the situation factor.

11. The electronic device of claim 10, wherein the instructions, when executed, cause the at least one processor, individually and/or collectively, to,
based on the classified situation factor comprising a cleanliness factor and an air purifier being available in the user terminal, instruct the air purifier to perform an air purifying action.

12. The electronic device of claim 10, wherein the instructions, when executed, cause the at least one processor, individually and/or collectively, to,
based on the classified situation factor comprising a cleanliness factor and a cleaner device being available in the user terminal, instruct the cleaner device to perform a cleaning action.

13. The electronic device of claim 10, wherein the instructions, when executed, cause the at least one processor, individually and/or collectively, to,
based on the classified situation factor comprising a mood factor and at least one of an audio device and a video device being available in the user terminal, instruct a change of content played on the at least one of an audio device and a video device.

14. The electronic device of claim 10, wherein the instructions, when executed, cause the at least one processor, individually and/or collectively, to,
based on an external device matched to the classified situation factor and registered in the user terminal being turned off, turn on the external device.

15. The electronic device of claim 1, wherein the instructions, when executed, cause the at least one processor, individually and/or collectively, to:
classify a candidate device group capable of supporting a classified situation factor and select at least one external device from the classified candidate device group.

16. The electronic device of claim 15, wherein the instructions, when executed, cause the at least one processor, individually and/or collectively, to:
search for an available device connected to the user terminal while belonging to the classified candidate device group; and
determine, based on the available device being found, the found available device as the at least one external device.

17. The electronic device of claim 1, wherein the instructions, when executed, cause the at least one processor, individually and/or collectively, to,
based on a plurality of available external devices being matched for the classified situation factor, present one or two more action scenarios of a scenario of operating all of the plurality of available external devices, a scenario of operating only some of the plurality of available external devices, and a scenario of not operating all external devices.

18. A method implemented by at least one processor, the method comprising:
receiving utterance data from a user terminal using a communication module;
classifying a situation factor based at least partially on the utterance data;
determining, from a plurality of external device types, one or more external devices that match the classified situation factor; and
generating and presenting to the user terminal one or more action scenarios for the one or more external devices determined for the classified situation factor prior to implementation of the presented action scenario.

19. The method of claim 18, wherein
determining the one or more external devices comprises:
determining one or more devices capable of converting a situation caused by the classified situation factor into another situation as the one or more external devices that match the classified situation factor.

20. A non-transitory computer-readable storage medium storing instructions that, when executed by at least one processor comprising processor circuitry, cause the at least one processor, individually and/or collectively, to perform operations of claim 18.

* * * * *